FIG. 1

INVENTORS
CHARLES G. ROPER,
EDGAR S. GILCHRIST &
HARRY E. LOCKERY
BY Mason, Kolehmainen, Rathburn and Wyss
ATTORNEYS

Jan. 7, 1964 C. G. ROPER ETAL 3,117,310
MINIATURIZED ELECTRONIC INDICATING CONTROLLER
UNIT FOR PROCESS CONTROL SYSTEMS
Filed April 29, 1957 5 Sheets-Sheet 2

INVENTORS
CHARLES G. ROPER,
BY EDGAR S. GILCHRIST &
HARRY E. LOCKERY

ATTORNEYS

INVENTORS
CHARLES G. ROPER,
EDGAR S. GILCHRIST &
HARRY E. LOCKERY
BY
Mason, Kolehmainen, Rathburn and Wyss.
ATTORNEYS Jan. 7, 1964 C. G. ROPER ETAL 3,117,310
MINIATURIZED ELECTRONIC INDICATING CONTROLLER
UNIT FOR PROCESS CONTROL SYSTEMS
Filed April 29, 1957 5 Sheets-Sheet 5

INVENTORS
CHARLES G. ROPER,
EDGAR S. GILCHRIST &
HARRY E. LOCKERY
BY
Mason, Kalehmainen, Rathburn and Wyss
ATTORNEYS United States Patent Office 3,117,310
Patented Jan. 7, 1964

3,117,310
MINIATURIZED ELECTRONIC INDICATING CONTROLLER UNIT FOR PROCESS CONTROL SYSTEMS
Charles Garland Roper and Edgar S. Gilchrist, Fairfield, and Harry E. Lockery, Hamden, Conn., assignors, by mesne assignments, to Robertshaw Controls Company, a corporation of Delaware
Filed Apr. 29, 1957, Ser. No. 655,660
14 Claims. (Cl. 340—187)

The present invention relates to electronic process control systems for industrial processes and the like, and more particularly, to a miniaturized electronic indicating controller unit which provides all of the necessary process control functions between transmitter and valve positioner in an electronic process control system. While the invention is of general utility, it is particularly suitable for use with and will be described in connection with an electronic process control system of the type shown and described in a copending application of Charles G. Roper and Edgar S. Gilchrist, Serial No. 389,564, filed November 2, 1953, which issued on August 16, 1960, as U.S. Letters Patent No. 2,949,273, and assigned to the same assignee as the present invention.

In process control systems certain facilities are required at the control area to provide the component functions required between the transmitter, or primary measuring element and the valve positioner or final control element which are located in the process area. These functions include the establishing of a set point to which the process is controlled, indicating or recording the value of the measured variable of the process from a preceding transmitter and also indicating the value of the set point or, in the case of cascade control systems, the output of a previous controller unit. In addition, it is necessary to provide a controller which introduces certain control functions in accordance with the particular type of process, these functions including the conventional proportional band control, rate action and automatic reset action. It is also necessary to provide in the control area a manual valve positioner and automatic-to-manual changeover facilities so that the process may be controlled manually as well as automatically. In the above identified copending application there is disclosed an electronic process control system wherein all of the described facilities are provided in the control area in conjunction with a transmitted direct current signal of standardized current range. While the system disclosed in this copending application is entirely suitable for its intended purpose, the set point, controller and valve positioner units are separate and distinct units which take up a relatively large amount of panel space which is at a premium in console type applications wherein it is desired to indicate a large number of control systems at a common location.

Accordingly, it is an object of the present invention to provide a new and improved process control system unit which is extremely compact and provides all of the necessary facilities for the set point, controller and manual positioner functions in a process control system of the electrical type.

It is another object of the present invention to provide a new and improved indicating controller unit for an electronic process control system which is extremely compact and requires a minimum of panel space.

It is a further object of the present invention to provide a new and improved indicating controller unit for an electronic process control system wherein the set point, process and valve position are all indicated in a common unit occupying a minimum amount of panel space.

It is a still further object of the present invention to provide a new and improved indicating controller unit for an electronic process control system wherein the set point portion, controller portion and manual positioner portion are in the form of individual plug-in units which may be readily inserted or removed for service and repair while, at the same time, requiring a minimum number of connections for initial installation.

Another object of the present invention resides in the provision of an improved electronic process control system wherein an electrical set point signal arrangement is employed which requires no calibration and the accuracy of which is limited only by the accuracy and repeatability of a standard meter movement.

A further object of the present invention resides in the provision of a new and improved electronic process control system wherein improved automatic-to-manual changeover facilities are provided.

It is another object of the present invention to provide a new and improved process control system of the electronic type wherein a simplified set point-controller unit is provided which requires only a single electromechanical balance unit to provide both set point and controller functions.

It is another object of the present invention to provide a new and improved set point-controller unit for an electronic process control system wherein transistors are employed in conjunction with an electromechanical balance unit to provide electrical set point and controller functions.

The invention, both as to its organization and method of operation, together with further objects and advantages thereof, will best be understood by reference to the following specification taken in connection with the accompanying drawings, in which.

Figure 1:
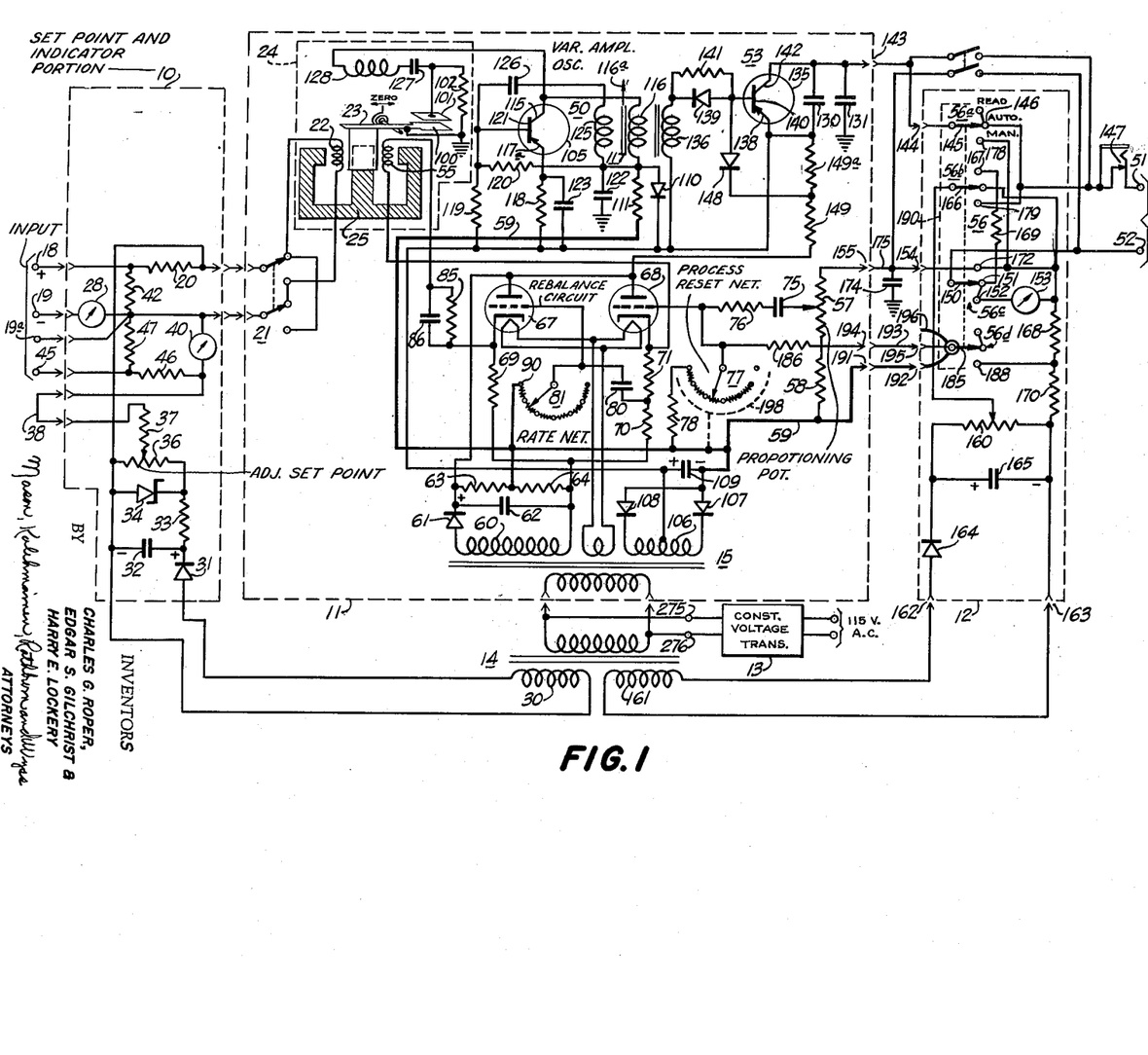
FIG. 1 is an electrical schematic diagram of the improved indicating controller unit of the present invention.
Figure 2:
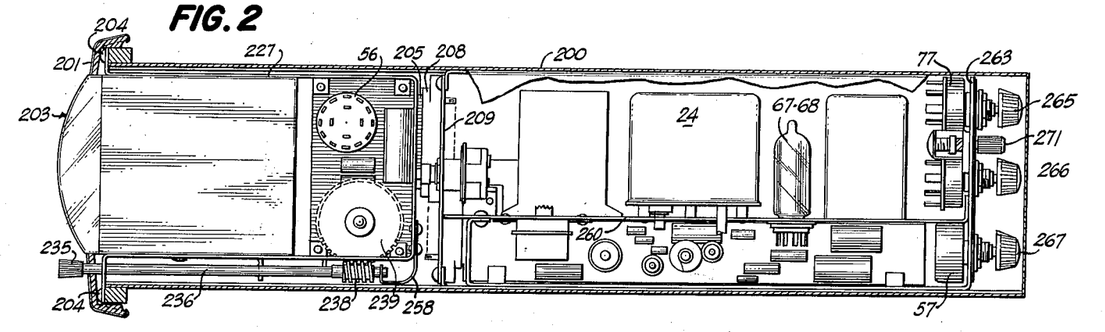
FIG. 2 is a right side view of an indicating controller unit embodying the features shown schematically in FIG. 1.
Figure 3:
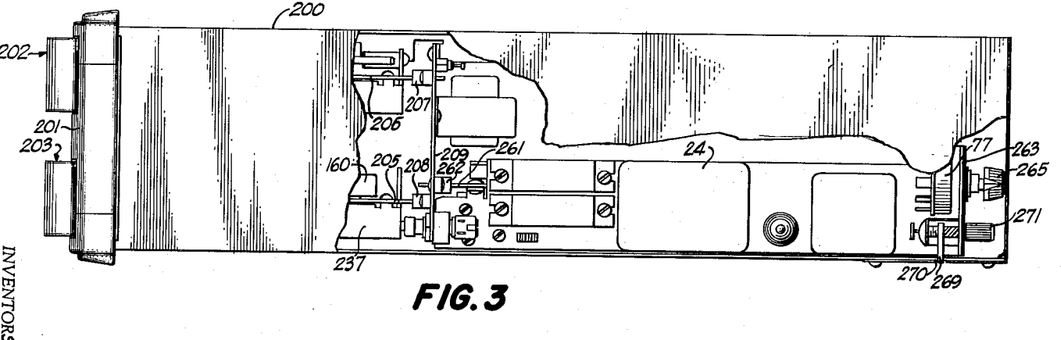
FIG. 3 is a plan view of the indicating controller unit of FIG. 2.
Figure 4:
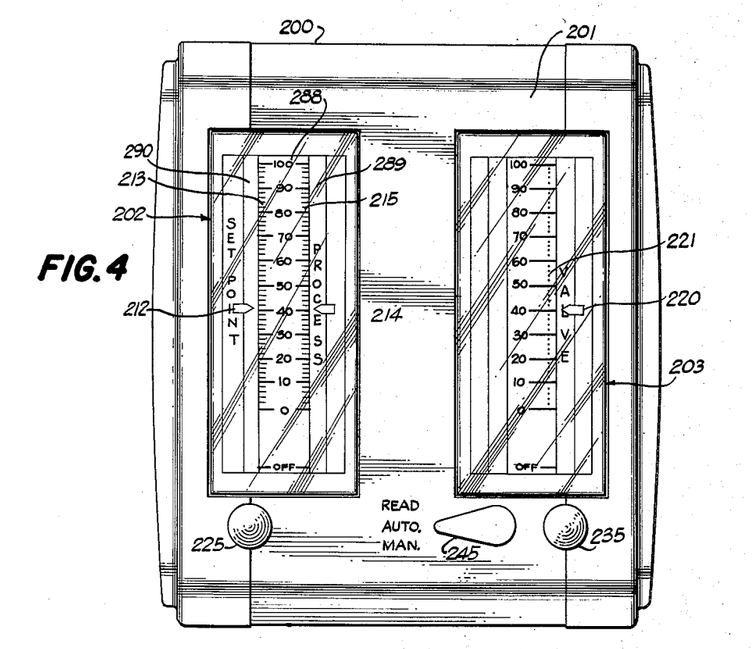
FIG. 4 is a front elevational view of the unit of FIG. 2.
Figure 5:
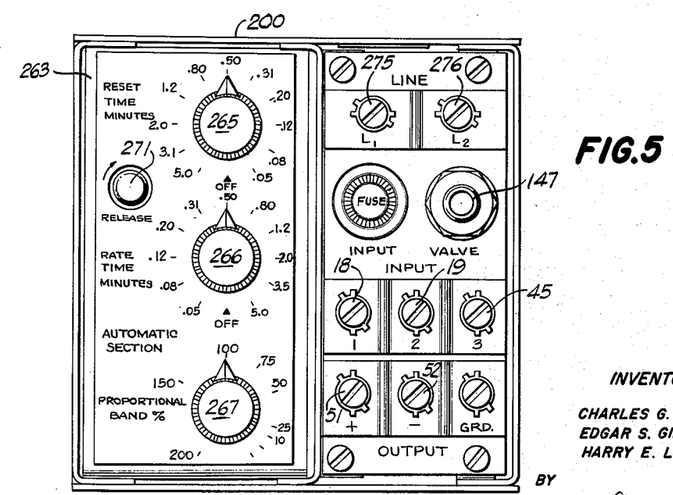
FIG. 5 is a rear elevational view of the unit of FIG. 2.
Figure 6:
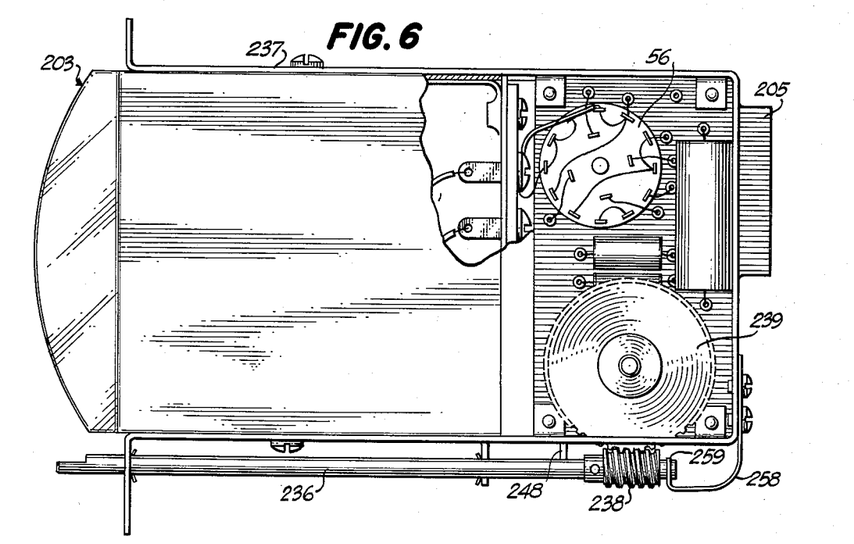
FIG. 6 is a side elevational view of the manual indicating subassembly of the unit of FIG. 2.
Figure 7:
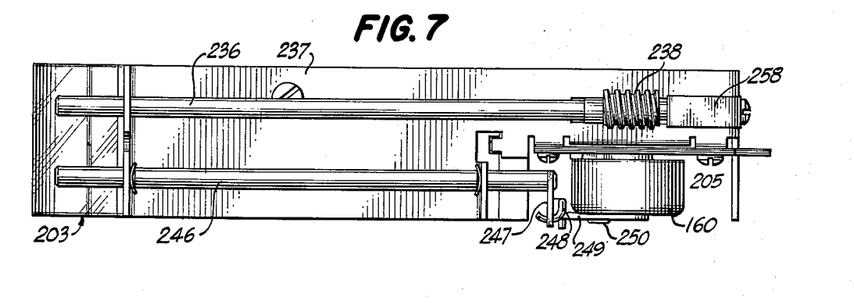
FIG. 7 is a bottom view of the subassembly of FIG. 6.
Figure 8:
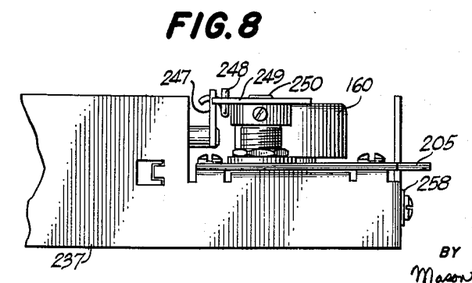
FIG. 8 is a top view of the subassembly of FIG. 6.
Figure 9:
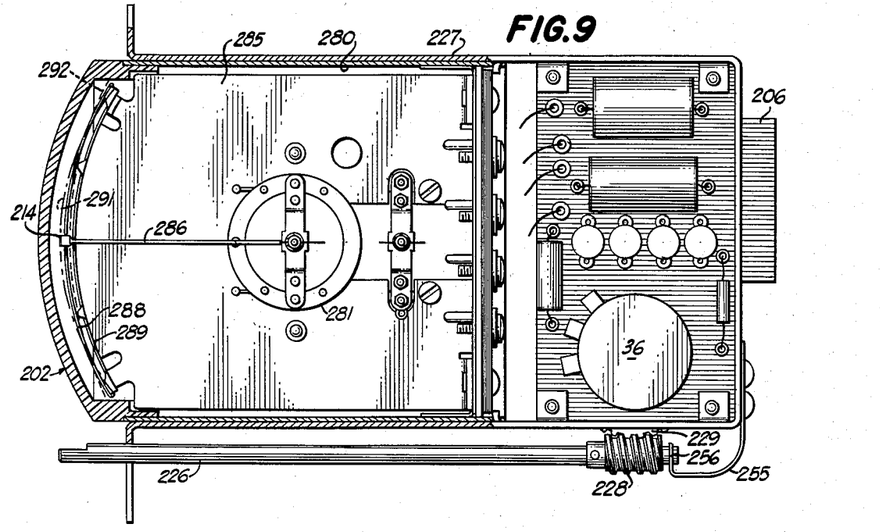
FIG. 9 is a side elevational view of the set point and process indicating subassembly of the unit of FIG. 2.
Figure 10:
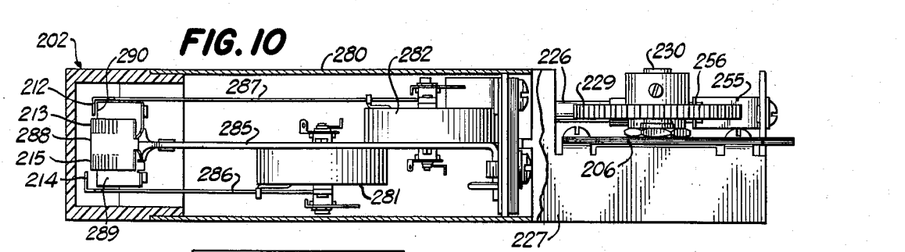
FIG. 10 is a top view of the subassembly of FIG. 9.
Figure 11:
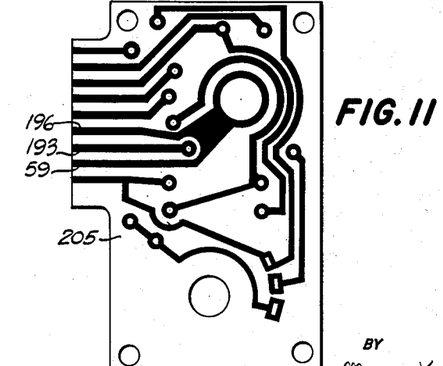
FIG. 11 is a side elevational view of one of the printed circuit terminal boards used in the unit of FIG. 2.

Referring now to the drawings and more particularly to FIG. 1 thereof, the present invention is therein illustrated as comprising a set point and process indicating portion 10, a controller portion 11 and a manual positioner portion 12, the portions 10 and 12 being energized from a constant voltage transformer 13 through a power transformer indicated generally at 14 and the controller portion 11 being energized from the constant voltage transformer 13 through a power transformer indicated generally at 15.

A direct current transmission signal, which may be developed at the process area by any suitable primary measuring element or transmitter means, such as the transmitter means shown in the above identified copending application, and which is preferably of a standardized current range, is connected by way of suitable signal transmission conductors (not shown) to the control area and is connected to the input terminals 18 and 19 of the set point portion 10. A portion of this direct current input signal flows through the series resistor 20, a reversing switch 21 in the controller portion 11 and through a coil 22 which is mounted on the pivotal beam 23 of an electromechanical balance unit indicated generally at 24, the coil 22 being positioned in a magnetic field developed in an annular air gap of the magnetic structure 25 so that current flowing through the coil 22 exerts a torque on the beam 23 proportional thereto. The total direct current transmitter input signal flows through a direct current meter 28 so that the meter 28 at all times indicates the value of the measured variable in the process area.

In accordance with an important phase of the present invention, an electrical set point signal is developed within the portion 10 which is well regulated so that it is substantially independent of fluctuations of the plant line voltage employed to energize the indicating controller unit. More particularly, the alternating current signal developed across the winding 30 of the power transformer 14 is impressed upon a selenium rectifier 31 and filter condenser 32 in series so that a voltage of approximately 80 volts and of the polarity indicated in FIG. 1 is developed across the condenser 32. In order to provide a high degree of regulation, the voltage developed across the condenser 32 is impressed upon the series combination of a resistor 33 and a back connected silicon junction diode 34. The diode 34 exhibits a Zener breakdown voltage characteristic which provides for large changes of current with but a very slight increase in voltage so that extremely good voltage regulation is provided across the diode 34. A set point adjustment potentiometer 36 is connected across the Zener diode 34 and the arm of the potentiometer 36 is connected through the dropping resistor 37, a jumper connection 38, a direct current set point meter 40, the reversing switch 21 and the coil 22 back to the bottom end of the potentiometer 36. It will be noted that the electrical set point current developed at the arm of the potentiometer 36 flows through the coil 22 in the opposite direction from current flow due to the direct current input signal impressed upon the input terminals 18 and 19. Accordingly, the potentiometer 36 may be adjusted to any desired set point current, as indicated on the meter 40, and the force exerted on the beam 23 will be the resultant of the two currents flowing in opposition through the input coil 22. Since with present day silicon diodes a relatively small regulated current is available, which is of less magnitude than the standardized maximum input current impressed upon the terminals 18 and 19, a voltage divider resistor 42 is connected across the input terminals 18 and 19 and diverts a portion of the direct current input signal so that only a small portion of this input signal flows through the coil 22.

In some instances a cascade type of process control system is required wherein the direct current input signal is derived not from a primary measuring element or transmitter but from a preceding controller which itself is responsive to a measured variable such as temperature and provides a direct current output signal of the same standardized current range. In such instances the primary controller output current may be connected to the input terminals 18 and 45 of the set point portion 10 so that this primary controller current will flow through the resistor 20, the reversing switch 21, the coil 22, the meter 40 and a series resistor 46. In accordance with a further phase of the present invention, this primary controller current cannot flow through the process meter 28 and the transmitter output circuit connected between the terminals 18 and 19 because the transmitter output circuit is arranged to have a relatively high source impedance even though this transmitter is capable of driving the relatively low impedance load represented by the coil 22 and the resistors 20 and 42. This is because the transmitter employs negative feedback, as described in detail in the above identified copending application, so that the output current is stabilized and hence the output impedance of the transmitter is increased by the factor of the loop gain within the transmitter. In a similar manner the transmitter input current cannot flow through the output circuit of the primary controller which is connected between the terminals 18 and 45 because this primary controller also has a relatively high source impedance by the use of negative feedback in the controller, as described in detail in the above identified copending application. Accordingly, interaction between the primary controller circuit connected to the terminals 18 and 45 and the transmitter circuit connected to the terminals 18 and 19 is substantially eliminated while providing an arrangement wherein both of these signals, as well as the electrical set point signal developed in the portion 10, may be supplied to the input coil 22 of the electromechanical balance unit 24.

Since the transmitter input current is divided down by an appropriate ratio to be in the same range as the Zener diode set point current, it is also necessary to divide down the primary controller current by the same ratio since all of these currents are impressed upon the common input coil 22. Accordingly, there is provided the resistor 47 which is connected across the series combination of the meter element 40 and the resistor 46 and the ratio of the resistance of the coil 22 to its divider resistors 20 and 42 is made equal to the ratio of the resistance of the meter element 40 to the divider resistors 46 and 47. All of the resistors 20, 37, 42, 46 and 47 are preferably held to close tolerances and the resistance of the meter 40 is likewise held to close tolerances so that an extremely accurate voltage divider arrangement is provided whereby the proportion of the set point current which flows through the coil 22 is accurately indicated on the meter 40. In this connection it will be noted that in a simple process control system wherein only the transmitter input signal is impressed upon the terminals 18 and 19, the set point meter 40 will indicate the actual value of the electrical set point as determined by the adjustment of the potentiometer 36. On the other hand if a cascade control system is employed wherein a primary controller current is additionally impressed between the terminals 18 and 45, then the meter 40 will indicate the total set point, components of which are contributed both by the primary controller and the electrical set point potentiometer 36. In the alternative, the primary controller can be connected to the terminals 18 and 19a so that the set point meter 40 and process meter 28 are bypassed insofar as primary controller current is concerned. Such circuit arrangements have the advantage that the operator can adjust the set point component contributed by the potentiometer 36 independently of the primary controller action. For example, in a process control system wherein temperature is employed to reset the flow of gas to a furnace, if the temperature increases substantially the primary controller produces an output signal calling for less flow of gas to the furnace and the temperature controller may call for zero flow which would snuff out the burners in the furnace. To eliminate such a situation, the operator can, in the system of the present invention, set the set point component contributed by the potentiometer 36 to, say, 10% so that when the primary controller current goes to zero the total set point cannot fall below 10% and hence a small flow of gas will be maintained to the burners.

It will also be noted that in the above described system of the present invention no calibrated positioning of a shaft or lever is required to provide the set point adjustment and calibration of such a shaft for total travel, zero position and linearity is completely eliminated in the present system since all that the operator has to do in the present electrical set point system is to adjust the potentiometer 36 until the meter 40 indicates the desired set point (in a non-cascade system) and the accuracy of the meter 40 is the only element involved in calibration since the same electrical set point current flows through both the meter 40 and the input coil 22 and the mechanical adjustment of the shaft of the potentiometer 36 need not be calibrated in any way since the potentiometer 36 is merely a means of varying the electrical set point current which is indicated on the meter 40.

Considering now the details of the controller portion 11 of the indicating controller unit of FIG. 1, a movement of the beam 23 is employed to produce a variable capacity effect which is in turn employed to control the amplitude of oscillation of an oscillator circuit indicated generally at 50. The output of the oscillator circuit 50 is detected and amplified in a detector-amplifier stage 53 to a suitable power level that a signal of standardized current range is supplied by way of the manual positioning portion 12 to the output terminals 51 and 52 of the unit of FIG. 1, which output terminals may be connected to a suitable valve positioner unit located in the process area, as described in detail in the above identified copending application.

In accordance with an important phase of the present invention a feedback current is developed in accordance with the output current flowing in the load circuit or circuits connected to the output terminals 51 and 52, and proportional, reset and rate components of this feedback current are impressed upon a feedback coil 55 which is positioned on the beam 23 within the annular air gap in the magnetic structure 25 so as to exert a torque on the beam 23 in opposition to the torque developed by the input current flowing through the coil 22 and provide a closed loop system in the controller 11. More specifically, the output current flowing through the load circuits connected between the terminals 51 and 52 flows through an automatic-to-manual changeover switch, indicated generally at 56 and described in more detail hereinafter, and this output current flows through a proportional band potentiometer 57 and a series resistor 58 to the common bus 59 of the power supply portion of the controller 11. The power transformer 15 of the controller 11 includes a first winding 60, the voltage of which is rectified in a selenium rectifier 61 to produce a voltage of the polarity shown in FIG. 1 across a filter condenser 62. A voltage divider comprising the resistors 63 and 64 is connected across the condenser 62 to establish a midpoint potential for the common bus 59 and the positive terminal of the condenser 62 is connected to the anodes of a pair of cathode follower triodes 67 and 68. The negative terminal of the condenser 62 being connected through the cathode resistor 69 to the cathode of the cathode follower 67 and through the resistors 70 and 71 to the cathode of the cathode follower 68.

The voltage developed between the arm of the potentiometer 57 and the common bus 59 is coupled through a reset capacitor 75 and a series resistor 76 to the control grid of the cathode follower 68 and a reset step potentiometer indicated generally at 77 is provided, the arm of the potentiometer 77 being connected to the control grid of the cathode follower 68 and one end of the potentiometer 77 being connected through the resistor 78 to the common bus 59. Also, a portion of the voltage developed across the cathode circuit of the cathode follower tube 68 is supplied through a rate function time constant network to the control grid of the cathode follower 57. More particularly, a rate condenser 80 is connected from the junction point of the resistors 70 and 71 in the cathode circuit of the tube 68 to the control grid of the cathode follower 67 and a rate step potentiometer indicated generally at 81 is provided, the arm of the potentiometer 81 being connected to the control grid of the tube 67 and one end of the potentiometer 81 being connected to the common bus 59. The cathode of the tube 67 is connected through the resistor 85 to one end of the feedback coil 55, the other end of which is connected to the cathode of the cathode follower tube 68, a condenser 86 being connected across the resistor 85 to provide an equalizing network and to stabilize the feedback channel at high loop gains.

Considering now the manner in which a feedback current is developed in the feedback coil 55 having proportional, reset and rate components, the output current supplied to the load circuit connected between the terminals 51 and 52 also flows through the potentiometer 57 and the resistor 58 so that adjustment of the potentiometer 57 produces a voltage between the arm thereof and the common bus 59 which is proportional to the value of the output current at any instant. This proportional component is applied to a reset time constant network which includes the series condenser 75 and the shunt step potentiometer 77 which constitute a differentiation network such that at the grid of the cathode follower tube 68 a differential component is introduced. Since this differentiation network is in the feedback channel of the controller, its effect is to produce an integrating or automatic reset component in the output current supplied to the output terminals 51, 52, as described in more detail in the above identified copending application.

The above described proportional and reset components which are impressed upon the control grid of the tube 68 are repeated across the cathode resistors 71 and 70 of this tube in like phase. If it is assumed that no rate component is being introduced the arm of the rate potentiometer 81 would be connected to the contact 90 of the potentiometer 81 and hence to the common bus 59 so that no voltage is impressed upon the control grid of the cathode follower tube 67 with the result that the cathode potential of the tube 67 remains fixed. Accordingly, the current flowing through the feedback coil 55 will be directly proportional to the variations in the cathode voltage of the cathode follower tube 68. If the arm of the proportional band potentiometer 57 is moved downwardly toward the common bus 59 so that only the voltage across the resistor 58 is impressed upon the cathode follower tube 68 a relatively small feedback current will be supplied to the feedback coil 55 with the result that a large forward gain from the input coil 22 to the output terminals 51, 52 is provided. Preferably, the circuit constants are so chosen that when the arm of the potentiometer 57 is adjacent the resistor 58 a full scale current output change of, for example, four milliamperes, will be produced for a three percent of full scale change in the input error current flowing through the coil 22. On the other hand, if the arm of the potentiometer 57 is adjusted to its upper end the overall gain of the system is preferably one-half and a two hundred percent of full scale change in the input error current is required to give a full scale current output change at the terminals 51, 52.

If it is assumed that the error current changes abruptly so that an abrupt voltage change is produced at the arm of the potentiometer 57, this abrupt voltage change will be transmitted through the reset condenser 75 since the charge cannot be changed instantaneously on this condenser and hence a feedback current proportional to the magnitude of the abrupt error current will be produced in the feedback coil 55. However, as this step function change is maintained the condenser 75 will be charged through the active portion of the reset potentiometer 77 and the resistor 78 so that the feedback current will change gradually in accordance with the time constant of the condenser 75 and the active portion of the potentiometer 77 to provide automatic reset action.

If it is desired to provide rate action as well as the above described proportional band and automatic reset action, the arm of the rate potentiometer 81 is adjusted to one of the contacts thereof such that the voltage developed across the cathode resistor 70 of the cathode follower tube 68 is coupled through the condenser 80 to the control grid of the cathode follower tube 67 and is repeated across the cathode resistor 69 in the same phase. The voltage developed across the cathode resistor 69 is impressed upon the upper end of the feedback coil 55 through the resistor 85 and the condenser 86 and hence subtracts from the voltage developed at the cathode of the cathode follower tube 68 which is connected to the bottom end of the feedback coil 55. This will be readily apparent when it is realized that if the cathodes of the tubes 67 and 68 are at the same potential and rise and fall in potential together no net current flow is produced in the feedback coil 55 since this coil is effectively connected between these two cathodes. Accordingly, the component of voltage produced across the cathode resistor 69 has the opposite effect from the voltage produced across the cathode resistors 71 and 70 of the tube 68 and the component of current flowing through the feedback coil 55 due to the voltage impressed upon the cathode follower tube 67 introduces a rate component into the total feedback current. This will be readily apparent when it is realized that the rate network including the condenser 80 and the potentiometer 81 acts as a differentiation network or high pass filter and functions selectively to transmit the high frequency components of the error signal to the grid of the cathode follower tube 67 more readily than the low frequency components. Since the high frequency components are readily transmitted through the condenser 80 to the control grid of the cathode follower tube 67 a relatively large voltage is produced across the cathode resistor 69 due to the high frequency components with the result that a relatively small feedback current is produced through the coil 55 since the voltage across the resistor 69 subtracts from the voltage developed across the cathode resistors 71 and 70 of the tube 68. Accordingly, a relatively small feedback current is produced for high frequency components which means that a relatively large forward gain from the input coil 22 to the output terminals 51, 52 is produced. On the other hand, the low frequency components will be partially or totally absorbed in the condenser 80 which charges through the active portion of the rate potentiometer 81 at these frequencies so that for low frequency components of the error signal a relatively small voltage is produced across the cathode resistor 69 with the result that a relatively large feedback current is produced through the coil 55 and a relatively low forward gain through the system. It will thus be evident that a differential or rate component is produced in the output current flowing through the load circuit connected to the terminals 51, 52 due to the action of the rate network 80, 81 and the differential connection of the feedback coil 55 between the cathodes of the tubes 67 and 68.

In order to limit the maximum gain in the forward channel of the controller due to the above described rate action, less than the total voltage developed at the cathode of the cathode follower tube 68 is impressed upon the rate cathode follower tube 67. More particularly, the voltage divider comprising the resistors 71 and 70 is provided, the resistor 70 preferably having a value approximately ten times the resistance of the resistor 71 so that the maximum gain in the forward channel of the controller due to the above described rate action is limited to approximately ten. In this connection it will be understood that if the total voltage developed at the cathode of the tube 68 were applied directly to the grid of the tube 67 the cathodes of these two tubes might rise and fall together with the result that no current flow would be produced through the feedback coil 55 which would produce a theoretically infinite gain in the forward channel of the controller. However, with the above described voltage divider arrangement the voltage variations produced at the cathode of the tube 67 are always less than the voltage variations produced at the cathode of the tube 68 so that a net voltage differential between these two cathodes is maintained and the maximum gain in the forward channel of the controller is limited to approximately ten. It will also be noted that with the feedback coil differentially connected between the two cathode followers 67 and 68 the feedback current is rendered substantially insensitive to hum voltages developed across the condenser 62 and fluctuations due to line voltage variations. This is because such hum voltages and line voltage fluctuations affect both cathode followers equally and hence do not appear across the differentially connected feedback coil 55. It will also be understood that the use of cathode followers in the feedback channel of the controller is particularly desirable because these cathode followers have an extremely linear response characteristic, and are not subject to errors due to changes in tube parameters such as amplification factor and plate resistance, and hence introduce no distortion or non-linearities which would appear in greatly amplified form at the output terminals 51, 52.

Considering now the forward channel or amplifier portion of the controller, it will be recalled that an oscillator circuit 50 is provided which produces a variable amplitude R.F. voltage in accordance with movement of the beam 23 and a D.C. amplifier circuit 53 is employed in conjunction with a rectifier circuit to develop a direct current output signal of suitable magnitude which is impressed upon the output terminals 51, 52 of the indicating controller unit and also flows through the proportional band potentiometer 57 and the resistor 58. In the illustrated embodiment the oscillator 50 and amplifier 53 both employ transistors which are connected in the specific manner described in detail hereinafter to provide a suitable forward channel amplifying section. However, it will be understood that a vacuum tube oscillator and amplifier arrangement may be employed, if desired, in which case the oscillator circuit could be of the bridge type shown and described in detail in the above identified copending application.

Movement of the beam 23 is translated into a variable capacitance by providing a variable capacitor plate 100 as part of the beam 23 which is connected to ground through the pivotal mounting structure of the beam and cooperates with a fixed capacitor plate 101 to provide a capacitor the capacitance of which varies in accordance with movement of the beam 23. A leakage resistor 102 is connected across the capacitor plates 100, 101 and prevents a static charge from building up on those plates so that no zero error is introduced in the controller 11. The oscillator 50 includes a transistor 105 which is a pnp junction type transistor connected in the grounded emitter configuration and is preferably of the commercial type 2N44.

In order to develop a suitable stabilized voltage supply for the oscillator circuit 50, a power winding 106 on the transformer 15 is employed in conjunction with the selenium rectifiers 107 and 108 to provide a full wave rectified voltage across the filter condenser 109 of the polarity shown in FIG. 1. A reverse connected silicon diode 110 is connected in series with a biasing resistor 111 across the filter condenser 109, the diode 110 being operated in the Zener breakdown voltage region so that a stabilized and well regulated voltage of approximately 20 volts is produced across the diode 110 under varying line voltage conditions. The collector 115 of the transistor 105 is connected through one winding 116 of a coupling transformer indicated generally at 117 to the negative side of the potential developed across the Zener diode 110 and the emitter 117a of the transistor 105 is connected through a resistor 118 to the positive terminal side of the voltage developed across the diode 110. A voltage divider comprising the resistors 119 and 120 is connected across the Zener diode 110 and the base 121 of the transistor 105 is connected to the junction point of the resistors 119 and 120. A bypass condenser 122 is connected from the junction point of the resistor 111 and the diode 110 to ground and a condenser 123 is connected across the resistor 118 to act as a bypass condenser for oscillator frequencies.

In order to provide sustained oscillations a feedback coil 125 is provided on the coupling transformer 117, one end of which is connected to the negative potential side of the diode 110 and the other end of which is connected through the condenser 126 to the base 121 of the transistor 105. A variable frequency tank circuit comprising the variable capacitor 100, 101, the series condenser 127 and a coil 128 is connected between the collector 115 of the transistor 105 and ground to control the operating frequency of the oscillator 50.

In accordance with an important aspect of the present invention the transistor 105 is operated in the class A range and the oscillator frequency is chosen in the region wherein the gain of the transistor varies inversely with frequency due to transit time effects in the transistor. With a Type 2N44 transistor operated in the grounded emitter configuration this inverse gain characteristic begins at approximately one hundred kilocycles and the oscillator frequency is preferably chosen in the range of from 500 to 700 kilocycles. In this frequency range the transistor 105, when operated in the grounded emitter configuration, has an internal phase shift of approximately 270°, as distinguished from the 180° phase shift in a vacuum tube oscillator, and hence the external coupling circuit between the collector 115 and the base 121 is chosen to introduce a phase shift of approximately 90° so that the total phase shift around the loop will be 360° and sustained oscillations will be produced at a frequency determined by the above described tank circuit 128, 127 and 100, 101. The small variable capacitor 100, 101 is used to control the oscillator frequency in a range where oscillator loop gain is only just enough to sustain oscillations. Loop gain is changing rapidly in this range because of the above described change in transistor gain with frequency due to transit time effects and because the loading on the transistor by the coupling transformer 117 varies with frequency. As a result, only a small change in the value of the capacitor 100, 101 is sufficient to vary the amplitude of oscillations developed in the collector winding 116 by a factor of five to one so that an input current variation of, for example, 0.5 to 1.0 microampere is required to tune the oscillator through its full scale output current range.

In order to produce oscillations of stable amplitude it is necessary to provide a system wherein the loop gain of the system is unity and the total phase shift around the loop is three hundred and sixty degrees. With the minimum capacity setting of the plates 100, 101 the circuit constants are adjusted so that these conditions are achieved with a relatively small amplitude of oscillations. As the tuning capacity 100, 101 is increased, due to a change in the error signal from the value corresponding to minimum capacity, the operating frequency goes down and the transistor gain increases due to the inverse gain-frequency characteristic of the transistor. As a result the loop gain becomes greater than unity and the amplitude of oscillations would build up indefinitely but for the non-linear gain versus amplitude characteristic of the transistor when in class A operation. In class A operation the gain versus amplitude characteristic of the transistor is only slightly non-linear and a large change in amplitude is required to produce the required decrease in gain and bring back the loop gain to unity. Only a very small change in capacity 100, 101 is sufficient to produce a large change in the amplitude of oscillations and hence a large change in the output current supplied to the terminals 51, 52. Accordingly, as the capacity 100, 101 varies the amplitude of oscillations is continuously adjusted to maintain an oscillator loop gain of unity. With the system shown in FIG. 1, a full scale change in output current at the terminals 51, 52 of 4.0 milliamperes was produced in response to a variation in the capacity 100, 101 of from 3.1 to 3.4 micromicrofarads, i.e., a change in capacity of 0.3 micromicrofarad. This change in capacity required only a change in input current in the coil 22 of 0.5 microampere which represents approximately 0.1% of full scale error current in the coil 22. It will thus be evident that extremely high sensitivity is provided in the controller 11.

In accordance with an important feature of the present invention, the above described oscillator tank circuit is so designed that the variable capacitor 100, 101 is the main factor controlling the frequency of oscillations notwithstanding the relatively large output capacitance at the transistor collector and its associated lead capacitance. More particularly, the coil 128 is provided which is connected in series with the isolating condenser 127 to the variable capacitor 100, 101 so that the total circuit inductance is increased by a factor of approximately 4 with the result that a much smaller variable capacitor is required to obtain the desired high oscillator frequency. Preferably, the coil 128 is positioned within the housing of the electromechanical balance unit 24 so that all lead capacities are isolated by the coil 128 and have relatively little effect on the variable capacitor 100, 101. Since the collector capacitance and other parameters of the transistor 105 may vary from one transistor to another and the capacitance 100, 101 of the balance 24 and other circuit constants may vary from unit to unit, it is necessary to provide for such variations in capacity and circuit constants. Accordingly, the coil 116 is made tunable by means of a conventional iron core tuning slug 116a so that the inductance of the winding 116 (and the coupling between the windings 116 and 125) can be varied to obtain the correct operating conditions. Also, the Zener diode 110 functions to remove ripple components from the voltage supplied to the collector 105 since the collector capacity is voltage sensitive and in part determines the oscillator frequency. If the diode 110 is not employed an amplified ripple component can be produced in the output circuit of the controller 11.

The transistor 105 has a leakage current which cannot be eliminated and which may be considered as a signal injected into the base 121 thereof. This leakage current is unidirectional and its effect on the collector current will depend upon the D.C. amplification S of the transistor 105. Furthermore, this leakage current or cut-off current $I_{co}$ increases with increasing temperature so that the oscillator operating point of the transistor is shifted with variations in ambient temperature. Also, at relatively high temperatures and when a large direct current amplification is provided, the leakage current may become so excessive as to destroy the transistor. Since the transistor 105 is used as an A.C. amplifier for the above described oscillations, D.C. negative feedback can be introduced into the transistor 105 to decrease the direct current amplification S thereof and thereby maintain the operating point relatively constant and prevent a relatively large leakage current from flowing at high ambient temperatures. More particularly, the resistors 119 and 120 are provided to introduce bias stabilization in the base circuit of the transistor 105 and to lower the D.C. gain of the transistor. With this arrangement, the operating point of the oscillator is not shifted outside the oscillation range with high ambient temperatures and the amplified leakage current is sufficiently small to permit satisfactory operation at high temperatures. Furthermore, the network 119, 120 stabilizes the oscillator operating point so that transistors having different characteristics may be employed while providing substantially uniform results. This is because the stabilized voltage supply determines the voltage applied to the network 119, 120 and the voltage across the network 119 in turn determines the collector current of the transistor.

Considering now the operation of the amplifier 53, in the illustrated embodiment this amplifier is shown as employing a transistor 135. However, it will be understood that a suitable vacuum tube may be employed if desired in the event that the advantages of transistor operation are not desired. The direct current amplifier 153 must produce sufficient gain that the maximum current output of, for example, five milliamperes, may be supplied to the output terminals 51, 52 with a sufficiently small level of oscillations across the variable capacitor 100, 101 that the electrostatic forces developed between the movable plate 100 and the fixed plate 101 are not sufficiently large to cause attraction of the beam plate 100 to the fixed plate 101. Since the torque exerted on the beam 23 by the input coil 22 due to current flow therethrough is relatively small, the amplifier 53 must produce a substantial gain so that the capacitor plates 100 and 101 may be spaced relatively far apart while providing a high degree of sensitivity for the overall controller unit. To this end, an output winding 136 is provided on the coupling transformer 117, the bottom end of which is connected to the emitter 138 of the transistor 135 and the upper end of which is connected through a germanium diode 139 to the base 140 of the transistor 135. A resistor 141 is connected across the diode 139 for reasons to be described in more detail hereinafter and the transistor 135, which is preferably of the commercial type 2N44, is operated in the grounded emitter configuration wherein the emitter is directly connected to the positive terminal of the power supply condenser 109. A bypass condenser 130 is connected between the collector and emitter of the transistor 135 and a condenser 131 is connected from the collector to ground. The collector 142 of the transistor 135 is connected by way of the manual positioning portion 12 to the output terminals 51, 52. More particularly, the collector 142 is connected through the plug-in connections 143 and 144 of the portions 11 and 12, respectively, to the arm 145 of the switch section 56a of the automatic-to-manual changeover switch 56 which, in the automatic position, is connected to the contact 146 which is in turn connected through the metering jack 147 to the output terminal 51. The output terminal 52 is connected to the arm 150 of the switch section 56c which in the automatic position is connected to the contacts 151 and 152. The contact 152 is connected to one side of a direct current meter 153 which in the automatic position reads the value of direct current supplied to the output terminals 51, 52, the other side of the meter 153 being connected by way of the plug-in connections 154 and 155 of the portions 12 and 11, respectively, to the upper end of the proportional band potentiometer 57 and through the resistor 58 to the common bus 59 to complete the circuit to the bottom end of the power supply condenser 109. It will be noted that the power supply for the cathode follower tubes 67 and 68 is tied to the power supply for the oscillator 50 and amplifier 53 through the connection of the common bus 59 to the bottom end of the power supply condenser 109, although these two power supplies are used to energize different portions of the controller 11.

Considering now the operation of the above described amplifier circuit 53, the variable amplitude R.F. voltage produced across the output winding 136 is rectified by the diode 139 and the base to emitter circuit of the transistor 135 and the resultant direct current signal is amplified in the transistor 135 to the desired output level suitable for application to the output terminals 51, 52. If it is assumed that the minimum output current at the terminals 51, 52 must be no greater than one milliampere under the maximum ambient temperature conditions, it will be evident that the D.C. amplification of the transistor 135 must be limited by an amount sufficient that the leakage current, which increases with ambient temperature, is not greater than one milliampere when amplified by the D.C. gain S within the transistor 135. If the winding 136 is directly connected to the base 140 of the transistor 135 the low impedance of the winding 136 would mean that a large D.C. negative feedback would be provided and the transistor 135 would be effectively operated as a grounded base transistor. However, under such conditions the gain of the transistor 135 would not be sufficient to permit the desired wide spacing between the capacitor plates 100 and 101 to eliminate the effects of electrostatic attraction therebetween. To obviate this situation, the rectifier 139 is inserted between the winding 136 and the base 140 so that the above described degenerative current cannot flow through the base circuit and the transistor 135 is operated with substantially increased gain such that a relatively small amplitude of R.F. oscillations is required across the winding 136. It has been found that when the rectifier 139 is included the capacitor plates 100 and 101 may have a spacing of 20 mils with a sensitivity such that a 2 mil motion of the beam 23 provides a four milliampere output current change through a 3,000 ohm load resistance connected between the output terminals 51 and 52 when this load resistance is in series with a 5,000 ohm proportional band potentiometer 57.

When the rectifier 139 is employed the transistor 135 is operated in the grounded emitter configuration so that the leakage current flowing to the collector 142 is substantially larger, and at 120° F. this collector current may be as large as 1.5 milliamperes. Accordingly, a resistor 141 is connected across the rectifier 139 to permit some current cancellation and hence reduction in the direct current gain of the transistor 35, the value of the resistor 141 being so chosen that the amplified leakage current at 120° F. is below one milliampere for all transistors.

In order further to reduce the effects of ambient temperature on the transistor 135, the anode of a biasing diode 148 is connected to the base 140 of the transistor 135 and the cathode of the diode 148 is connected to the junction of two voltage dividing resistors 149 and 149a which are connected from the positive terminal of the condenser 62 to the common bus 59 and are chosen to provide the desired bias for the diode 148. The diode 148 is preferably of the germanium junction type and is connected to produce a current flow through the emitter-base junction of the transistor in a direction opposite to that of the $I_{co}$ current flow through this junction. As a result, the transistor 135 is biased to provide a minimum current through the load circuit due to the $I_{co}$ of the transistor 135. In addition, the diode 148 is electrically similar to the emitter-base junction of the transistor 135 and produces a larger biasing current as the ambient temperature increases to offset the increase in $I_{co}$ of the transistor 135 with increasing temperature. If the diode 148 is not temperature sensitive then a large biasing current would be required by the diode 148 at room temperatures and a larger output from the oscillator 50 would be required to overcome this bias.

Considering now the details of the automatic-to-manual changeover portion 12, the changeover switch 56 is so arranged that when it is desired to change from automatic to manual operation, the ganged switch sections of the switch 56 are thrown to the read position (upper position in FIG. 1) wherein the value of the manually variable current developed in the portion 12 is displayed on the meter 153. The manual control potentiometer 160 is then adjusted so that the meter 153 has the same reading it previously had on automatic operation after which the switch 56 is thrown to the manual position (bottom position in FIG. 1). With such an arrangement the manual and automatic currents can be matched very precisely since the repeatability of the meter 153 can be made the only factor involved in comparing the manual and automatic currents before the actual changeover is made.

To energize the portion 12, a winding 161 on the transformer 14 is connected by way of the plug-in connections 162 and 163 to the series combination of a selenium rectifier 164 and the filter condenser 165 so that a voltage of the polarity shown in FIG. 1 is developed across the condenser 165. The potentiometer 160 is connected across the condenser 165 and the arm of the potentiometer 160 is connected to the arm 166 of the switch section 56b. In the read position of the switch 56 the arm 166 of the switch section 56b is connected by way of the contact 167, the contacts 151 and 152 of the switch section 56c, the meter 153 and the series resistors 168 and 170 to the negative terminal of the potentiometer 160. As a result, in the read position of the switch 56 the meter 153 reads the value of manual control current as established by the position of the arm on the potentiometer 160. However, it will be noted that during the read position the output terminals 51, 52 remain connected in the output circuit of the amplifier 53. Thus, in the read position the arm 145 of the switch section 56a remains connected to the terminal 51 and the arm 150 of the switch section 56c is connected to the contact 172 thereof, thus bypassing the meter 153 which is used during the read position to indicate manual control current. A condenser 174 is connected between the conductor 175 and ground to eliminate transients produced during the switching operations of the automatic-to-manual changeover switch 56. In the read position the value of manual control current may be varied by adjusting the potentiometer 160 until the meter reading of the meter 153 remains the same when the switch 56 is actuated back and forth between the read and automatic positions. Preferably a resistor 169 is included between the contacts 167 and 152 on the switch sections 56d and 56c, respectively, the resistance value of the resistor 169 being chosen to equal that of the load circuit connected between the output terminals 51 and 52. With this arrangement the accuracy on automatic-to-manual changeover is limited solely by the accuracy and repeatability of the meter 153 when the manual and automatic comparisons are made in the read and automatic positions of the changeover switch 56.

After the meter 153 has been adjusted to equal the value of the automatic control current then flowing in the load circuit, the switch 56 is thrown to the manual position in which position the switch arm 145 is connected to the contact 173 so that the output of the transistor 135 is connected directly to the upper end of the proportional band potentiometer 57. At the same time, the switch arm 166 is connected to the contact 179 so that manual control current flows through the load circuit connected between the output terminals 51, 52 and back through the switch arm 150, the contact 152, the meter 153, and the resistors 168 and 170 to the bottom end of the potentiometer 160. Accordingly, in the manual position of the switch 56 the meter 153 again reads the value of manual current as established by the position of potentiometer 160, this current now flowing through the load circuit connected between the output terminals 51 and 52.

During the period when the changeover switch 56 is in the manual position, the controller 11 will not follow the manually produced variations in output current and hence when the system is changed back from manual to automatic operation the controller portion 11 will not be adjusted to the correct output current and an abrupt change in the output current will be produced which will "bump" the process. To prevent such a condition, a fourth switch section 56d is provided on the changeover switch 56 and the arm 185 of the switch section 56d is connected through a resistor 186 in the controller portion 11 to the control grid of the cathode follower tube 68. In the automatic and read positions of the switch 56 the arm 185 is open circuited. However, in the manual position of the switch 56 the arm 185 is connected to the contact 188 which is in turn connected to the junction point of the resistors 168 and 170 so that the resistor 168 is connected in series with the resistor 186 between the upper end of the proportional band potentiometer 57 and the control grid of the cathode follower tube 68. The resistor 168 is equal in resistance value to the proportional band potentiometer 57 and the minimum feedback resistor 58 so that a voltage proportional to the manual current flow through the resistor 168 is continuously coupled through the resistor 186 to the control grid of the cathode follower tube 68 during manual operation.

It will be noted that the voltage developed by manual current flow through the resistor 168 and the voltage developed across the proportional band potentiometer 57 in the output circuit of the amplifier 53, are connected in opposition to the control grid of the cathode follower tube 68 during manual operation so that the controller 11 is continuously adjusted in accordance with variations in the manual control current as determined by the setting of the potentiometer 160. As a result, when the change from manual to automatic operation is made the controller 11 will be operating at the correct level for changeover and no bump in the process will be produced if the system is at zero error. More particularly, if we assume that the arm of the potentiometer 57 is at the upper end thereof and no error current is flowing in the input coil 22, it will be evident that no current should flow through the feedback coil 55 and if we assume that the rate potentiometer 81 is connected to the terminal 90 thereof, it will also be evident that zero voltage at the control grid of the cathode follower 68 is required so that equal voltages will be produced across the cathode circuits of the tubes 67 and 68 to produce zero current in the feedback coil 55. If we assume for purposes of illustration that the resistor 168 has a value of 5,000 ohms and the potentiometer 57 and its associated resistor 58 have a collective resistance of 5,000 ohms and it is assumed further that the value of 5 milliamperes output current is made to flow through the resistor 168 by adjustment of the potentiometer 160, it will be evident that the resistor 185 and the resistor 168 are connected in series from the control grid of the tube 168 to the upper end of the potentiometer 57 and the condenser 75 will be charged to the full value of the voltage produced across the resistor 168, i.e., 25 volts. This voltage is from negative to positive so that the upper end of the potentiometer 57 is 25 volts more positive in potential than the grid of the cathode follower tube 68. However, if a 5 milliampere current is also flowing through the proportional band potentiometer 57 and the resistor 58, there will be a voltage drop of 25 volts across the potentiometer 57 and the resistor 58 in the opposite direction from the voltage across the condenser 75 so that the net voltage between the grid of the cathode follower tube 68 and the common bus 59 will be zero, which is the correct voltage to give the above described zero current condition in the feedback coil 55. If the manual current is changed by adjustment of the potentiometer 160 so that the voltage across the resistor 168 falls to say 12½ volts, then there is a net positive voltage impressed on the grid of the cathode follower 68 and current will flow through the feedback coil in the correct direction to move the beam 23 until the current flow through the potentiometer 57 and the resistor 58 exactly equals the new voltage across the resistor 168, i.e., 12½ volts. As a result the controller 11 will continuously follow adjustment of the manual control current potentiometer 160 and if the process is on the set point when the process is changed back from manual to automatic operation no bump in the process is produced.

It will also be noted that when the switch 56 is thrown to the manual position the voltage developed across the resistor 168 is applied to the condenser 75 through the resistor 186 and the resistor 76. The value of the resistor 186 is so chosen that the charge on the condenser 75 may be changed without an undue time delay while at the same time suppressing transients and spurious voltages which may be produced within the portion 12. However, when the proportional band potentiometer 57 is in the narrow proportional band setting, i.e., adjacent the resistor 58, it will be noted that the resistor 186 and the condenser 75 introduce a large amount of phase shift in the lagging direction such that the loop within the controller 11 may tend to oscillate. To prevent this, the resistor 76 is included in series with the condenser 75 so that the condenser 75 must be charged through the resistor 76 and the lagging phase shift thereby reduced.

In this connection it will be understood that the above described phase shift is particularly noticeable at the higher frequencies, at which point the resistance of the resistor 76 becomes increasingly large with respect to the reactance of the capacitor 75.

Since the resistance of the reset potentiometer 77 is quite large, it is desirable to arrange the circuit so that any leakage resistance of the manual-to-automatic changeover switch 56 is not shunted across the reset condenser 75 because such leakage resistance would then introduce some feedback and would reduce the maximum reset obtainable with the unit. To this end the case of the automatic-to-manual changeover switch 56, indicated by the dotted line 190 in FIG. 1 is connected to the common bus 59 through the plug-in connections 191 and 192 in the units 11 and 12, respectively. In addition, the changeover lead 193 which connects the resistor 186 to the arm 185 of the switch section 56b through the plug-in connections 194 and 195 of the units 11 and 12, respectively, is surrounded by a conductor 196 so that any leakage from the conductor 193 must necessarily be to the common conductor 59 with the result that any leakage resistance in the changeover switch 56 or the changeover lead 193 is connected across the reset potentiometer 77 and not across the reset condenser 75. The physical configuration of the conductors 193 and 196 is described in more detail hereinafter. In addition, the case of the reset potentiometer 77, indicated by the dotted lines 198 is also connected to the common conductor bus 59 so as to insure that leakage resistance from this potentiometer to its case is connected in parallel to the active portion of this potentiometer.

By way of example only, the following circuit constants have been found satisfactory in the circuit of FIG. 1 to provide the above described sensitivity and accuracy of control:

Resistor 20 __________________________ 221.5 ohms.
Resistor 33 __________________________ 10,000 ohms.
Resistor 37 __________________________ 8,200 ohms.
Resistor 42 __________________________ 28.5 ohms.
Resistor 46 __________________________ 1265.5 ohms.
Resistor 47 __________________________ 162.5 ohms.
Resistor 118 _________________________ 3,900 ohms.
Resistor 111 _________________________ 2,700 ohms.
Resistor 119 _________________________ 3,300 ohms.
Resistor 120 _________________________ 8,200 ohms.
Resistor 107 _________________________ 1.0 megohm.
Resistor 141 _________________________ 1,000 ohms.
Resistor 76 __________________________ 470,000 ohms.
Resistor 58 __________________________ 75 ohms.
Resistor 186 _________________________ 5,600 ohms.
Resistor 70 __________________________ 180,000 ohms.
Resistor 71 __________________________ 20,000 ohms.
Resistor 69 __________________________ 200,000 ohms.
Resistor 85 __________________________ 43,000 ohms.
Resistor 78 __________________________ 750,000 ohms.
Resistor 168 _________________________ 5,100 ohms.
Resistor 170 _________________________ 27,000 ohms.
Resistor 149 _________________________ 5,600 ohms.
Resistor 149a ________________________ 560,000 ohms.
Potentiometer 36 ____________ 10,000 ohms.
Potentiometer 57 ____________ 5,000 ohms.
Potentiometer 77 ____________ 75.0 megohms (total).
Potentiometer 81 ____________ 75.0 megohms
Potentiometer 160 ___________ 50,000 ohms.
Condenser 32 _______________ 1.5 microfarads.
Condenser 127 ______________ 1500 micromicrofarads.
Condenser 126 ______________ 1500 micromicrofarads.
Condenser 122 ______________ 1500 micromicrofarads.
Condenser 123 ______________ 1500 micromicrofarads.
Condenser 75 _______________ 4.0 microfarads.
Condenser 80 _______________ 4.0 microfarads.
Condenser 174 ______________ .01 microfarad.
Condenser 130 ______________ .01 microfarad.
Condenser 131 ______________ 1500 micromicrofarads.

Transformer 117:
   Winding 116 ____________ 1.05 millihenries.
   Winding 125 ____________ 1.6 millihenries.
   Winding 136 ____________ 16.8 microhenries.
   Mutual inductance between
     116 and 125 ____________ 0.36 millihenry.
   Mutual inductance between
     116 and 136 ____________ .07 millihenry.
   Coil 128 _________________ 3.0 millihenries.
   Tubes 67 and 68 _________ Type 12AX7.
   Transistors 105 and 135___ Type 2N44.

Considering now the constructional features of the indicating control unit schematically shown in FIG. 1, and referring to FIGS. 2 to 11, inclusive, of the drawings, the indicating controller unit of FIG. 1 is therein illustrated as housed within a casing 200 to which the front cover 201 of the instrument is removably secured. The front cover 201 is of relatively small dimensions, preferably about five inches square, so that the indicating controller unit takes up a minimum amount of panel space and is adapted for console installations wherein all of the control functions of an entire refinery may be located in one console.

The front cover 201 is provided with suitable apertures for a pair of indicating subassemblies indicated generally at 202 and 203 which are removably secured to the casing 200 by means of the screws 204 and are provided with printed circuit terminal boards 205 and 206, respectively, which are adapted to plug into printed circuit sockets 207 and 208 mounted on a transverse partition 209 within the casing 200. The indicating subassembly 202 contains the meter units 23 and 40 of the set point portion 10 shown in FIG. 1, the pointer 212 of the set point meter 40 being positioned adjacent a graduated set point scale 213 and the pointer 214 of the process meter 23 being positioned contiguous to a graduated process scale 215. The indicating subassembly 203 includes the valve meter 153 of FIG. 1, the pointer 220 of which is positioned adjacent a graduated valve scale 221. A set point control knob 225 is connected to a shaft 226 extending through the front cover 201, the shaft 226 being journalled in the U-shaped subchassis 227 of the indicating assembly 203 and having a worm 228 on the rear end thereof which engages the worm wheel 229 connected to the shaft 230 of the set point potentiometer 36 which is positioned on and secured to the printed circuit board 206.

A manual control knob 235 is connected to the end of a shaft 236 which extends through the front cover 201 and is journalled in the subchassis 237 of the manual positioner indicating unit 203, the shaft 236 being provided with a worm 238 at the rear end thereof which engages the worm wheel 239 secured to the shaft of the manual control potentiometer 160 which is supported on the printed circuit board 205. In addition, an automatic-to-manual changeover knob 245 is provided which is secured to the end of a shaft 246 extending through the front cover 201, the shaft 246 having a right angle arm 247 secured to the rear end thereof which is connected through the vertically extending link 248 to an arm 249 secured to the shaft 250 of the automatic-to-manual changeover switch 56, which switch is in the form of a four-section three-position wafer switch. The switch 56 is mounted on the upper portion of the printed circuit terminal board 205, which is shown in detail in FIG. 11, and the case of the switch 56 is adapted to make electrical contact with the printed circuit conductor 300 of the board 205. The conductor 300 is connected to the printed circuit portions of the conductors 196 and 59 which enclose the printed circuit portion of the conductor 193 so that any leakage to the case of the switch 56 and any leakage from the conductor 193 must necessarily be to the common bus 59 so that this leakage resistance appears across the reset potentiometer 77 and not across the reset capacitor 75. In this connection it will be understood that the ends 301 of the printed circuit conductors on the board 205 are adapted to engage corresponding receptacles in the multiple socket 206 with the exception of the end of the conductor 196 which is actually a part of the conductor portion 59 on the board 205.

It will be noted that the worm drive connection between the knobs 225 and 235 and their respective potentiometers 36 and 160 permits a relatively large force to be exerted on the shafts of the respective potentiometers such that the potentiometer arm may be forced against the end stops thereof and permanently damaged. To prevent this, an overtravel declutching mechanism is provided for both the worms 228 and 238 so that they are effectively disconnected from their respective worm wheels if the associated potentiometer is moved against its internal stop and excessive force is exerted on the corresponding control knob. More particularly, a flexible member 255 is secured to the subchassis 227 is provided with an upturned end portion 256 within which the end of the shaft 226 is journalled. The member 225 is of sufficient rigidity that the shaft 226 remains fixedly positioned when normal torques are exerted on the shaft 226. However, when the shaft of the potentiometer 36 has been moved against its stop so that the worm wheel 229 can no longer move in that direction, the member 255 is of sufficient flexibility to permit the worm 228 to ride out of the teeth of the worm wheel 229 and thereby effectively disconnect the shaft 226 from the shaft of the potentiometer 36 to prevent damage to this potentiometer. In a similar manner a flexible member 258 is secured to the subchassis 237 and is provided with an upturned end portion 259 which journals the end of the shaft 237, the member 258 performing the same disconnect function with respect to the shaft 237 as that described above in connection with the member 255. It will thus be evident that both the potentiometer 36 and the potentiometer 160 are protected from excessive force being exerted on the stops thereof through the worm drive connections while providing an arrangement wherein the speed reduction of these worm and worm wheel assemblies are utilized for accurate positioning of both the set point control potentiometer 36 and the manual control potentiometer 160.

The casing 200 also houses a subchassis 260 on which are positioned the components of the controller portion 11 schematically shown in FIG. 1, the subchassis 260 being provided with a printed circuit terminal board 261 which is adapted to engage the printed circuit socket 262 when the subchassis 260 is inserted into the casing 200 from the rear end thereof. The subchassis 260 is provided with a rearwardly extending control panel 263 on which are mounted the reset potentiometer 77, the rate potentiometer 81 and the proportional band potentiometer 57, the control knobs 265, 266 and 267 being provided for these potentiometers, respectively. Preferably suitable scales are provided on the control panel 263 which cooperate with the pointers of the control knobs 265, 266 and 267 to indicate the setting of the respective potentiometers for reset time, rate time and proportional band percentage. The subchassis 260 is provided with a retaining latch 269 which holds the chassis 260 in position within the casing 200 by engagement in the aperture 270 thereof and may be rotated out of the aperture 270 by means of the release knob 271 when it is desired to remove the chassis 260 from the casing 200. At the rear of the casing 200 there is also provided a fixed terminal board which mounts the input terminals 18, 19 and 45, the output terminals 51, 52, a ground terminal, the plug-in jack 147 and the line terminals 275 and 276 to which is supplied the output voltage from the constant voltage transformer 13 of FIG. 1.

Considering now the constructional features of the dual meter movement indicating unit 202, it is pointed out that this unit contains a subassembly 280 which houses the meter movement 281 of the process meter 28 and the meter movement 282 of the set point meter 40 in such manner that the pointers 212 and 214 of these meter movements are positioned adjacent the vertical scales 213 and 215 while providing an overall assembly which is extremely compact and permits the entire indicating controller unit to occupy a minimum amount of panel space. More particularly, the meter movements 281 and 282 are mounted on a central partition 285 in offset relation to one another so that the laterally projecting bearing portions of each meter movement are not positioned in alignment with the result that a very narrow dual meter indicating unit is provided. Since the arms 286 and 287 of the meter movements 281 and 282 must be of unequal length to position the pointers 212 and 214 adjacent the common scale member 288, the scale 288 is provided with the recessed edge portions 289 and 290 so that the pointers 212 and 214 can shift with respect to the surface of the scales 213 and 215 throughout their arcuate travel. In the midpositions shown in FIG. 9, the pointer 214, which describes an arc of shorter radius, is positioned just slightly ahead of the scale 215 and describes the arc shown in dotted lines in FIG. 9 at 291. Also, in the midposition of the pointer 212, which describes the arc of longer radius, the pointer 212 is positioned just slightly behind the scale 213 and describes the arc shown in dotted lines in FIG. 9 at 292. It will be noted that the paths 291 and 292 are at all times relatively close to the associated scales so that even with the above described lateral offset of the meter movements 281 and 282 very little parallax error is introduced while providing an arrangement which is extremely compact and suitable for a miniature panel display.

While there has been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. In an automatic process control system, a pivoted member including a control element, electromagnetic current responsive means for deflecting said member, means for developing an input current signal variable over a predetermined range in accordance with a measured variable of the process, means for developing an electrical signal representing a set point which is manually variable over said predetermined range, means for applying said input signal and said set point signal in opposition to said electromagnetic current responsive means, means responsive to movement of said control element for developing an output current signal which is proportional to the deviation of said input current signal from said electrical set point signal, and means responsive to said output current for applying a negative feedback force to said member in accordance with the value of said output current signal.

2. In an automatic process control system, a deflectable member including a control element, means for developing an input current signal variable over a predetermined range in accordance with a measured variable of the process, means for producing an electrical current signal representing a set point which is manually variable over said predetermined range, coil means carried by said deflectable member, means for applying said electrical input signal and said set point signal in opposition to said coil means to produce a resultant force on said member, means responsive to movement of said member for developing an output current signal which is proportional to the deviation of said input current signal from said electrical set point signal, and means responsive to said output current and including further coil means on said deflectable member for applying a negative feedback force to said member in accordance with the value of said output current signal.

3. In an automatic process control system, a deflectable member including a control element, means for developing an input current signal variable over a predetermined range in accordance with a measured variable of the process, means for producing an electrical current signal representing a set point which is manually variable over said predetermined range, coil means carried by and movable with said deflectable member, means for applying said input signal and said set point signal in opposition to said coil means to produce a resultant force on said member, means responsive to movement of said member for developing an output current signal, a control potentiometer, further coil means carried by said deflectable member, and means including said control potentiometer and said further coil means for applying a negative feedback force to said member in accordance with said output current and the setting of said potentiometer.

4. In an automatic process control system, a deflectable member including a control element, means for developing an input current signal variable over a predetermined range in accordance with a measured variable of the process, means for producing an electrical current signal representing a set point which is manually variable over said predetermined range, a coil on said deflectable member, means for applying said input signal and said set point signal in opposition to said coil to produce a resultant force on said member, means responsive to movement of said member for developing an output current signal, a load circuit, a control potentiometer, means to supply said output current to said load circuit and said potentiometer in series, and electromagnetic current responsive means including a second coil carried by said deflectable member and energized in accordance with the setting of said potentiometer for applying a negative feedback force to said member.

5. In an automatic process control system, a deflectable member including a control element, means for developing an input current signal variable over a predetermined range in accordance with a measured variable of the process, means for producing an electrical signal representing a set point which is manually variable over said predetermined range, means for applying opposing forces to said member in accordance with said input signal and said set point signal, means responsive to movement of said member for developing an output current signal, a load circuit, a control potentiometer, means to supply said output current to said load circuit and said potentiometer in series, first and second cathode follower stages, a reset network connected between said potentiometer and said first cathode follower stage, a rate network connected between said first and second cathode follower stages, and electromagnetic current responsive means energized by said first and second cathode follower stages for applying a negative feedback force to said member.

6. In an automatic process control system, a deflectable member including a control element, means for developing an input current signal variable over a predetermined range in accordance with a measured variable of the process, means for producing an electrical current signal representing a set point which is manually variable over said predetermined range, a coil carried by said deflectable member, means for applying said input signal and said set point signal in opposition to said coil to produce a resultant force on said member, means responsive to movement of said member for developing an output current signal, means including a second coil on said member and responsive to said output current for applying a negative feedback force to said member in accordance with the value of said output current signal, and means for modifying the current supplied to said second coil to produce a process reset component in said output current signal.

7. In an automatic process control system, a deflectable member including a control element, means for developing an input current signal variable over a predetermined range in accordance with a measured variable of the process, means for producing an electrical current signal representing a set point which is manually variable over said predetermined range, a coil carried by said deflectable member, means for applying said input signal and said set point signal in opposition to said coil to produce a resultant force on said member, means responsive to movement of said member for developing an output current signal, means including a second coil on said member and responsive to said output current for applying a negative feedback force to said member in accordance with the value of said output current signal, and means for modifying the current supplied to said second coil to produce a process rate component in said output current signal.

8. In an automatic process control system, a deflectable member including a control element, means for developing an input current signal variable over a predetermined range in accordance with a measured variable of the process, means for producing an electrical current signal representing a set point which is manually variable over said predetermined range, coil means carried by said deflectable member, means for applying said input signal and said set point signal in opposition to said coil means to produce a resultant force on said member, means responsive to movement of said member for developing an output current signal, means including further coil means on said member and responsive to said output current for applying a negative feedback force to said member in accordance with the value of said output current signal, and means for modifying the current supplied to said further coil means to produce process rate and reset components in said output current signal.

9. In an automatic process control system, a deflectable member including a control element, means including coil means carried by said deflectable member for deflecting said member in accordance with an input current signal, a work circuit, a potentiometer, means responsive to deflection of said member for supplying an output current to said work circuit and said potentiometer, first and second signal transmission stages, means including a first time constant network for supplying a signal from said potentiometer to said first stage, means including a second time constant network for supplying a signal from the output of said first stage to said second stage, and means including further coil means carried by said deflectable member and connected in the output of said second stage for applying a force to said member in opposition to said input current signal.

10. In an automatic process control system, a deflectable member including a control element, means for deflecting said member in accordance with an input signal, a work circuit, a potentiometer, means responsive to deflection of said member for supplying an output current to said work circuit and said potentiometer, first and second cathode follower stages, means including a first time constant network for supplying a signal from said potentiometer to said first stage, means including a second time constant network for supplying a signal from the cathode circuit of said first stage to said second cathode follower stage, and means responsive to said first and second cathode follower stages for applying a force to said member in opposition to said input signal.

11. The arrangement as set forth in claim 10 wherein said first time constant network includes an adjustable impedance element to provide an adjustable automatic reset action.

12. The arrangement as set forth in claim 10 wherein said second time constant network includes an adjustable impedance element to provide an adjustable rate action.

13. In an automatic process control system, a deflectable member including a control element, means for deflecting said member in accordance with an input signal, a work circuit, a potentiometer, means responsive to deflection of said member for supplying an output current to said work circuit and said potentiometer, first and second cathode follower stages, means including a first time constant network for supplying a signal from said potentiometer to said first stage, means including a second time constant network for supplying a signal from the cathode circuit of said first stage to said second cathode follower stage, a feedback coil movable with said member and positioned in a magnetic field, and means for supplying signals from both said cathode follower stages to said feedback coil.

14. In an automatic process control system, an output circuit, automatic controller means for supplying a direct current signal to said output circuit in accordance with a desired mode of operation of the process, manually adjustable means for developing a direct current manual control signal, automatic-to-manual changeover switch means having automatic manual and read positions, a meter, and means including said switch means for connecting said meter in series with said output circuit in the automatic position of said switch means, connecting said meter in series with said direct current manual control signal in the read position of said switch means while maintaining said direct current signal connected to said output circuit, and connecting said meter and said output circuit in series with said direct current manual control signal in the manual position of said switch means.

References Cited in the file of this patent
UNITED STATES PATENTS

| | | |
|---|---|---|
| 2,117,894 | Lenehan | May 17, 1938 |
| 2,351,982 | Lenehan | June 20, 1944 |
| 2,423,617 | Rath | July 8, 1947 |
| 2,446,390 | Rath | Aug. 3, 1948 |
| 2,455,167 | Gilbert | Nov. 30, 1948 |
| 2,539,143 | Knudsen | Jan. 23, 1951 |
| 2,611,021 | Perls | Sept. 16, 1952 |
| 2,614,163 | Roper | Oct. 14, 1952 |
| 2,653,282 | Darling | Sept. 22, 1953 |
| 2,689,339 | Hornfeck | Sept. 14, 1954 |
| 2,932,817 | Kershaw | Apr. 12, 1960 |
| 2,934,267 | Wirkler | Apr. 26, 1960 |
| 2,949,273 | Roper | Aug. 16, 1960 |